United States Patent [19]

Nishibe et al.

[11] Patent Number: 4,811,609

[45] Date of Patent: Mar. 14, 1989

[54] TORQUE DETECTING APPARATUS

[75] Inventors: Yuji Nishibe; Yutaka Nonomura; Masaharu Takeuchi, all of Aichi, Japan

[73] Assignee: Kabushiki Kaisha Toyota Chuo Kenkyusho, Aichi, Japan

[21] Appl. No.: 192,621

[22] Filed: May 11, 1988

[30] Foreign Application Priority Data

May 12, 1987 [JP] Japan .................. 62-115362

[51] Int. Cl.$^4$ .............................................. G01L 3/10
[52] U.S. Cl. .................................................. 73/862.36
[58] Field of Search .......... 73/862.36, DIG. 2, 862.69

[56] References Cited

U.S. PATENT DOCUMENTS 3,903,739  9/1975  Kolavcic ........................ 73/862.69
4,697,459  10/1987  Nonomura ...................... 73/862.36

Primary Examiner—Joseph A. Orsino
Assistant Examiner—Hollis T. Chen
Attorney, Agent, or Firm—Oblon, Fisher, Spivak, McClelland & Maier

[57] ABSTRACT

A torque detecting apparatus for measuring the amount of magnetostriction of a rotary magnetic material which transmits torque by means of a magnetic sensor, and detecting the transmitted torque on the basis of the measured amount of magnetostriction. The apparatus comprises a magnetic sensor for measuring the amount of magnetostriction of the rotary magnetic material, a demagnetization coil which is opposed to the rotary magnetic material so as to restore the rotary magnetic material magnetized by a disturbing magnetic field to the state of zero magnetization, a demagnetization circuit for applying an oscillating current to the demagnetization coil so as to generate in the rotary magnetic material a periodic damping oscillating magnetic field having the maximum value larger than the coercive force of the rotary magnetic material; and a trigger circuit for outputting a drive timing signal for the demagnetization circuit. The transmitted torque is detected without being influenced by a disturbing magnetic field.

16 Claims, 11 Drawing Sheets

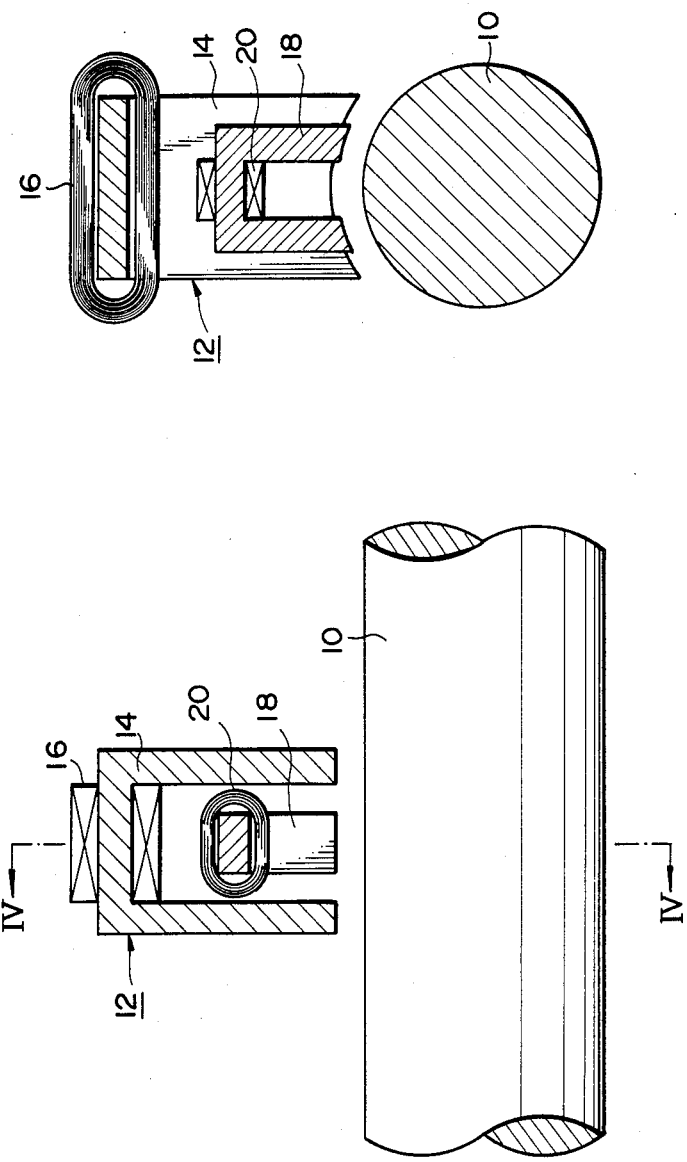

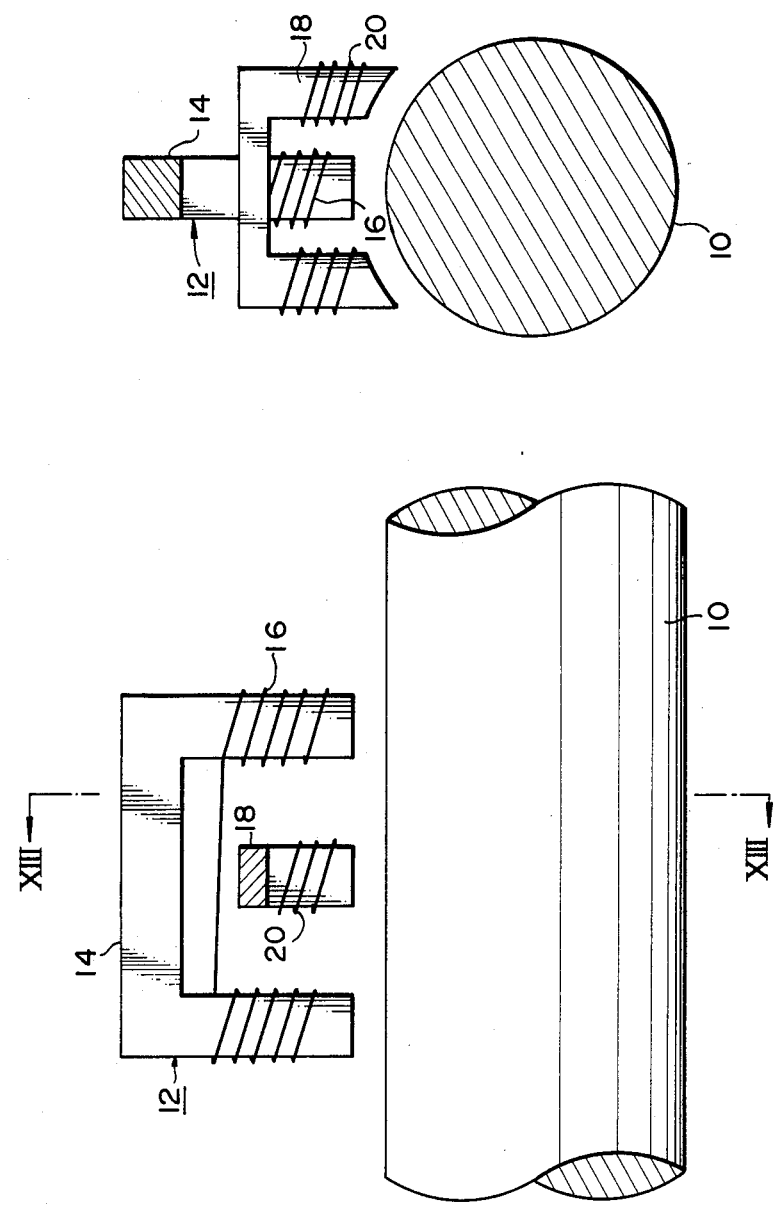

TORQUE DETECTING APPARATUS

BACKGROUND OF THE INVENTION

1. Field of the Invention

The present invention relates to a torque detecting apparatus and, more particularly, to an improved torque detecting apparatus which is capable of noncontactingly detecting the torque transmitted through a rotary magnetic material as magnetostriction.

2. Description of the Related Art

In various kinds of rotating drive mechanisms there is a need to measure torque simply and accurately because such measurement is exceedingly useful in a diverse range of industrial field for analyzing drive mechanisms and for obtaining a better understanding of their operating condition.

Rotary drive mechanisms are used as prime movers in virtually every sector of industry, the most common types thereof being automobile engines, electric motors of electric cars and industrial motors.

In accurately obtaining and analyzing the operating condition of such mechanisms, it is as important to be able to accurately determine transmitted torque as it is to determine the number of revolutions. Measurement of torque is particularly important in the case of automobile engines because by measuring the torque at the engine and at the transmission, propeller shaft, differential gear and other points of the drive system it is possible to control the ignition timing, the amount of fuel injection, the timing for transmission shift, the gear ratio, etc. As a result of the optimum control of these factors, it is possible to improve fuel efficiency, driving characteristics, etc.

In the case of industrial motors, accurate torque measurement can also provide data for optimizing control and diagnosis of rotary drive systems, thereby improving energy efficiency and driving characteristics.

For these purposes, various kinds of torque detecting apparatus have conventionally been proposed, one of them being an apparatus for noncontactingly measuring the torque transmitted through a rotary magnetic material as magnetostriction (U.S. Pat. No. 2,912,642).

It has already been known that when torque is transmitted through a rotary drive system, strain is produced in the rotary members such as a rotating shaft, flywheel and a clutch disc in proportion to the transmitted torque (U.S. Pat. No. 4,589,290, U.S. Pat. No. 4,697,460). Furthermore, a technique been proposed of noncontactingly measuring transmitted torque by detecting with a magnetic sesor the magnetostriction of a rotary magnetic material, which is a part of a rotary member for transmitting torque and is made of a ferromagnetic material (U.S. application No. 39,390).

FIGS. 12 and 13 show an example of a torque transmission mechanism of a vehicle engine provided with a magnetic sensor 12 of a torque detecting apparatus. FIG. 12 is a schematic side elevational view of the magnetic sensor 12, and FIG. 13 is a schematic sectional view of the magnetic sensor 12 shown in FIG. 12, taken along the line XIII—XIII.

As is known, the torque produced in the engine is transmitted to a rotary flywheel (not shown) through a torque transmitting shaft 10, and is transmitted to the transmission through a clutch disc which comes into frictional contact with the flywheel. When torque is transmitted in this manner, anisotropy of strain e which is proportional to the magnitude of the transmitted torque is generated on the torque transmitting shaft 10 and the rotary discs such as the clutch disc and the flywheel. If the torque transmission member is made of a ferromagnetic material, it is possible to measure the transmitted engine torque by magnetically detecting the magnitude of the generated anisotropy of strain by utilizing the magnetostrictive effect.

In the torque measuring apparatus, therefore, in order to make the rotary member to which torque is transmitted a rotary magnetic material, the torque transmitting shaft 10 or the flywheel themselves is made of a ferromagnetic material, or a ferromagnetic material is attached to the surface of the torque transmitting shaft 10 or the flywheel, and a magnetic sensor 12 is opposed to the rotary magnetic material formed in this manner with a predetermined space therebetween.

The magnetic sensor 12 is composed of a U-shaped excitation core 14 which is disposed in parallel to the torque transmitting shaft 10, and a U-shaped detection core 18 which is disposed inside the excitation core 14 such as to be orthogonal thereto, with an excitation coil 16 wound around the excitation core 14, and a detection coil 20 wound around the detection core 18.

FIG. 14 is a block diagram of the torque detecting apparatus. To the excitiation coil 16 a sine-wave voltage is applied from an AC power source 22 for alternating magnetization of the torque transmitting shaft 10, which is opposed to the magnetic sensor 12.

When torque is transmitted through the torque transmitting shaft 10, stress is produced in the torque transmitting shaft 10 and a magnetic flux component is generated in the direction orthogonal to the direction of excitation by virtue of the magnetostrictive effect.

The magnetic flux component is detected by the detection coil 20 as an induced voltage. The induced voltage is amplified by an alternating amplifier 24 and is thereafter rectified by a detector 26. This rectified signal S is output as a torque detection signal.

In this way, the torque detecting apparatus enables simple and accurate measurements of the transmitted torque in various kinds of rotating drive mechanisms, thereby analyzing drive mechanisms and obtaining a better understanding of their operating condition.

The conventional torque apparatus, however, is disadvantageous in that it is susceptible to disturbing magnetic fields for reasons to be given below, and particularly when a pulsating magnetic field is applied, the magnetized state of the rotary member is forced to change, thereby making the accurate measurement of transmitted torque impossible.

(a) FIG. 15 shows the magnetization characteristics of a rotary magnetic material. The rotary magnetic material is in the state of magnetization 0 (hereafter referred to as "zero magnetization"), as is indicated by the point B. When a pulsating disturbing magnetic field is applied to the rotary magnetic material in this state, the magnetized state is shifted to a residual magnetization state, as is indicated by the point A.

In the conventional detecting apparatus, therefore, after a pulsating disturbing magnetic field is generated, the magnetized state changes, which disadvantageously causes a change in the torque detection output. In other words, the conventional detecting apparatus cannot detect the torque accurately if there is much magnetic noise.

In particular, when such a conventional detecting apparatus is mounted on a vehicle engine, the rotary magnetic material is often magnetized due to a pulsating disturbing magnetic field irregularly generated from a solenoid valve or a spark plug. In this case, the conventional apparatus, which detects transmitted torque by utilizing a magnetostrictive effect, cannot detect the torque with high accuracy and good reproducibility, because the detection torque output inconveniently contains a comparatively large error component.

(b) When a nonuniform disturbing magnetic field is applied to the rotary magnetic material, irregular magnetization is produced so that the magnetized state becomes nonuniform at each part of the rotary magnetic material.

In this case, as shown in FIG. 10, the fluctuation width of the offset signal (detection signal S output when the transmitted torque is zero) in the circumferential direction of the rotary magnetic material becomes very large and, particularly, since the magnetized part produces a spike wave form, the detection signal S inconveniently changes even when the transmitted torque is constant.

Especially, in the case where the fluctuation of the offset output in the circumferential direction of the rotary magnetic material is large, when the rotary magnetic material is rotated, the detection output S varies as if the torque were transmitted even when the transmitted torque is zero. An effective countermeasure has therefore been demanded.

Recently, the measurement of transmitted torque with high accuracy and high responsiveness has increasingly been required for the purpose of the optimum control of various rotary systems such as an engine and a transmission. To meet such demand, development of an apparatus has been demanded which is capable of solving the above-described problems (a) and (b), and detecting the transmitted torque of a rotary magnetic material from a low rotation range to a high rotation range with high responsiveness, high accuracy and good reproducibility.

SUMMARY OF THE INVENTION

Accordingly, it is an object of the present invention to eliminate the above-described problems in the prior art and to provide a torque detecting apparatus which is capable of accurately detecting transmitted torque with high responsiveness and high reproducibility.

To achieve this aim, a torque detecting apparatus according to the present invention comprises:

a magnetic sensor for measuring the amount of magnetostriction of a rotary magnetic material which transmits torque;

a demagnetization coil which is opposed to the rotary magnetic material so as to restore the rotary magnetic material magnetized by a disturbing magnetic field to the state of zero magnetization;

a demagnetization circuit for applying an oscillating current to the demagnetization coil so as to generate in the rotary magnetic material periodic damping oscillating magnetic field having the maximum value larger than the coercive force of the rotary magnetic material; and a trigger circuit for outputting a drive timing signal for the demagnetization circuit;

whereby transmitted torque is detected on the basis of the amount of magnetostriction of the rotary magnetic material measured by the magnetic sensor without being influenced by a disturbing magnetic field.

The magnetic sensor is preferably opposed to the rotary magnetic material with a space therebetween so as to noncontactingly detect the amount of magnetostriction of the rotary magnetic material.

For the rotary magnetic material to which the magnetic sensor is opposed, any part of a rotary member to which torque is transmitted may be used; for example, a rotary shaft or a rotary disc is usable.

The rotary magnetic material is preferably made of a ferromagnetic material. For example, a ferromagnetic material may be circumferentially pasted to the periphery of the rotary member for transmitting torque or attached to the periphery by surface treatment. Alternatively, the rotary material itself may be composed of a ferromagnetic material.

In order to demagnetize the rotary magnetic material by means of the demagnetization coil, a predetermined periodic damping oscillating current is applied to the demagnetization coil so as to generate in the rotary magnetic material periodic damping oscillating magnetic field which has the maximum value larger than the coercive force of the rotary magnetic material.

As another demagnetizing treatment, there is a method of causing an oscillating current having a constant peak value to flow to the demagnetization coil and gradually increasing the distance between the demagnetization coil and the member being magnetized, namely, the rotary magnetic material. Such sweep in terms of distance can generate a similar periodic damping oscillating magnetic field in the rotary magnetic material.

The oscillating current is preferably a sine wave or a triangle wave.

The trigger circuit detects the disturbing magnetic field by means of a predetermined sensor and produces a timing pulse for driving the demagnetization circuit in synchronization with the detection signal. A Hall element, magnetic resistance element, search coil or the like may be used for the detection of the disturbing magnetic field. Alternatively, the demagnetization coil itself may be used.

The trigger circuit may also be so designed as to produce a timing pulse for driving the demagnetization circuit in synchronization with any given external signal, so that the demagnetizing treatment is possible at any given time.

The principle of the present invention will now be briefly explained.

The present inventors have investigated and analyzed the optimum magnetized state of a rotary magnetic material necessary for high-accuracy measurement of transmitted torque in the following way.

A bias magnetic field was applied to a rotary magnetic material over a range of ±200 Oe, as shown in FIG. 15, for example. The bias magnetic field was first increased from 0 Oe to 200 Oe, then decreased from 200 Oe to −200 Oe, and finally increased from −200 Oe to 200 Oe, as indicated by the curve B-H. In this way, the rotary magnetic material assumes all the magnetized states at various levels indicated by the curve B-H.

The present inventors have measured torques in the magnetized states at various levels to investigate, analyze and evaluate the output characteristics of a magnetic sensor.

As a result, it has been confirmed that when the rotary magnetic material is in the state of zero magnetization, the torque detection sensitivity is larger and the hysteresis width is smaller than in various other magnetized states.

It has also been confirmed that even if a nonuniform disturbing magnetic field is applied to the rotary magnetic material so as to generate an irregular magnetization on the rotary magnetic material, it is possible to make the whole rotary magnetic material assume the same magnetized state (state of zero magnetization) by demagnetizing the whole rotary magnetic material, thereby effectively suppressing the fluctuation of the offset output which is output from the magnetic sensor.

It will therefore be understood that even if the rotary magnetic material is varied by disturbing magnetic field, it is possible to constantly measure the transmitted torque of the rotary magnetic material with good reproducibility and high accuracy and stability by restoring the rotary magnetic material to the state of zero magnetization each time.

The operation of the present invention will be explained in the following.

The torque detecting apparatus of the present invention measures the amount of magnetostriction of a rotary magnetic material which transmits the torque by a sensor and detects transmitted torque on the basis of the measured amount of magnetostriction.

In a conventional torque detecting apparatus of such type, if a disturbing magnetic field is applied to the rotary magnetic material, the rotary magnetic material itself is magnetized and the detection sensitivity of the magnetic sensor and the offset component contained in the output signal disadvantageously change.

In contrast, the torque detecting apparatus of the present invention drives a trigger circuit after the generation of disturbing magnetic field, and outputs a drive time signal to a demagnetization circuit. The demagnetization circuit applies an oscillating current to a demagnetization coil so as to generate in the rotary magnetic material periodic damping oscillating magnetic field which has the maximum value larger than the coercive force of the rotary magnetic material.

By generating such periodic damping oscillating magnetic field in the rotary magnetic material, the magnetized state of the rotary magnetic material is restored to the state of zero magnetization (point B) as the oscillating magnetic field is attenuated, as shown in FIG. 2.

In this way, the torque detecting apparatus according to the present invention is capable of demagnetizing the rotary magnetic material and restoring it to the state of zero magnetization after the generation of a disturbing magnetic field. It is therefore possible to make the sensitivity and the offset component of the magnetic sensor constant, thereby measuring transmitted torque with high accuracy and good reproducibility.

In a conventional torque detecting apparatus, when an irregularly distributed disturbing magnetic field is applied to the rotary magnetic material, only some part of the rotary magnetic material may be magnetized, whereby the fluctuation of the offset output of the rotary magnetic material in the circumferential direction greatly increases.

In contrast, according to the present invention, it is possible to keep the rotary magnetic material as a whole in the same magnetized state, namely, in the state of zero magnetization by carrying out the above-described demagnetization treatment. It is therefore possible to greatly suppress the fluctuation of the offset output of the rotary magnetic material in the circumferential direction which is contained in the output signal of the magnetic sensor.

When the rotary magnetic material is in the stopping range or a low revolution range and the measurement of transmitted torque with good responsiveness is required in a conventional torque detecting apparatus, the variation of the offset output of the rotary magnetic material in the circumferential direction which is contained in the output signal of the magnetic sensor presents a sizable problem, because it is impossible to remove the rotational fluctuation by means of a low pass filter. According to the present invention, however, it is possible to constantly keep the whole rotary magnetic material in the uniform magnetized state, thereby solving such a problem and measuring transmitted torque with high responsiveness and good reproducibility from the state in which the torque transmitting shaft is stopped to a high rotational range.

As described above, according to the present invention, it is possible to measure transmitted torque with good reproducibility, high accuracy and high responsiveness without being influenced by a disturbing magnetic field applied to the rotary magnetic material.

The above and other objects, features and advantages of the present invention will become clear from the following description of the preferred embodiments thereof, taken in conjunction with the accompanying drawings.

BRIEF DESCRIPTION OF THE DRAWINGS

FIGS. 3 and 4 are schematic explanatory views of a magnetic sensor used in the apparatus shown in FIG. 1;

FIGS. 12 and 13 are schematic explanatory views of a magnetic sensor used in the conventional torque detecting apparatus;

DESCRIPTION OF THE PREFERRED EMBODIMENTS

Preferred embodiments of the present invention will be explained with reference to the accompanying drawings.

FIRST EMBODIMENT

Figure 1:
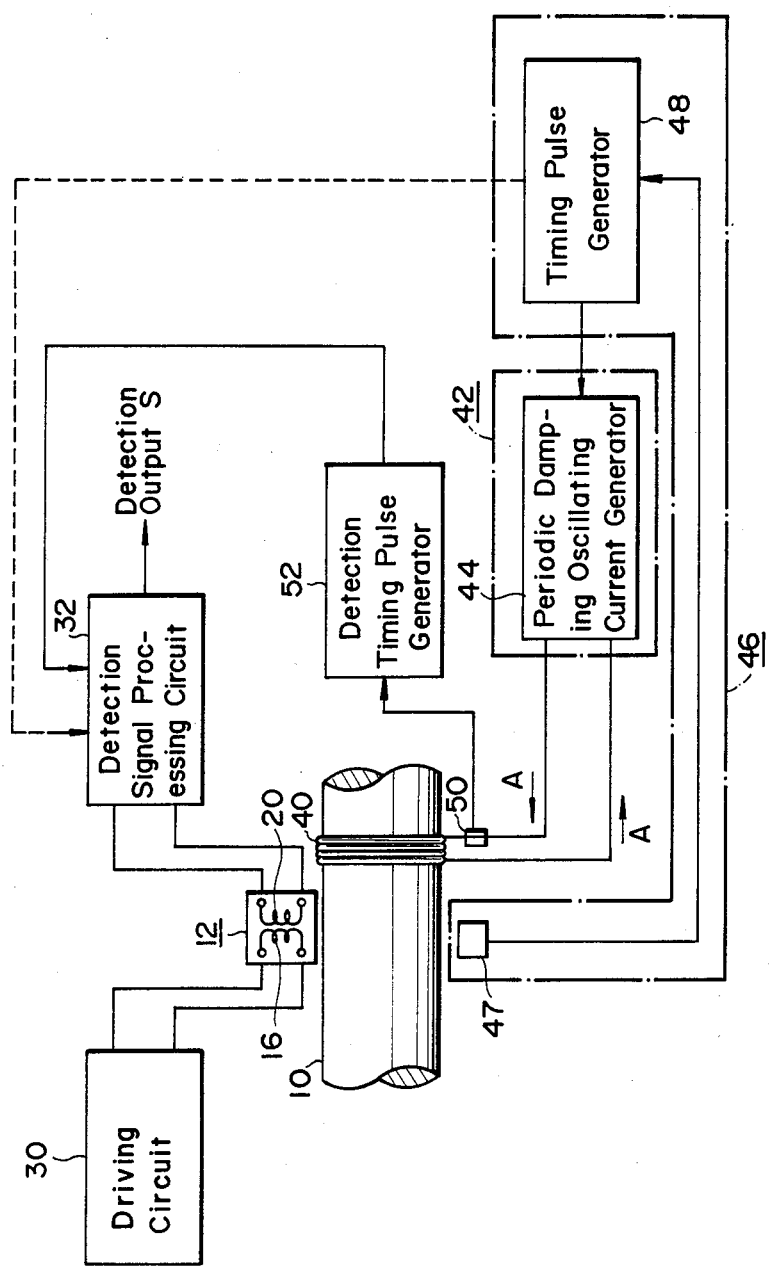
FIG. 1 is an explanatory view of a first embodiment of a torque detecting apparatus according to the present invention.

FIG. 1 shows a first embodiment of a torque detecting apparatus according to the present invention. In this torque detecting apparatus, a magnetic sensor 12 which is opposed to a torque transmitting shaft 10 with a space therebetween is used to detect the amount of magnetostriction generated in the torque transmitting shaft 10.

FIGS. 3 and 4 schematically show the magnetic sensor 12, wherein FIG. 3 is a schematic side elevational view thereof and FIG. 4 is a schematic front elevational view.

In this embodiment, the magnetic sensor 12 is composed of an excitation core 14 which is disposed in parallel to the torque transmitting shaft 10, and a detection core 18 which is disposed inside the excitation core 14 such as to be orthogonal thereto, with an excitation coil 16 wound around the excitation core 14, and a detection coil 20 wound around the detection core 18.

Figure 5:
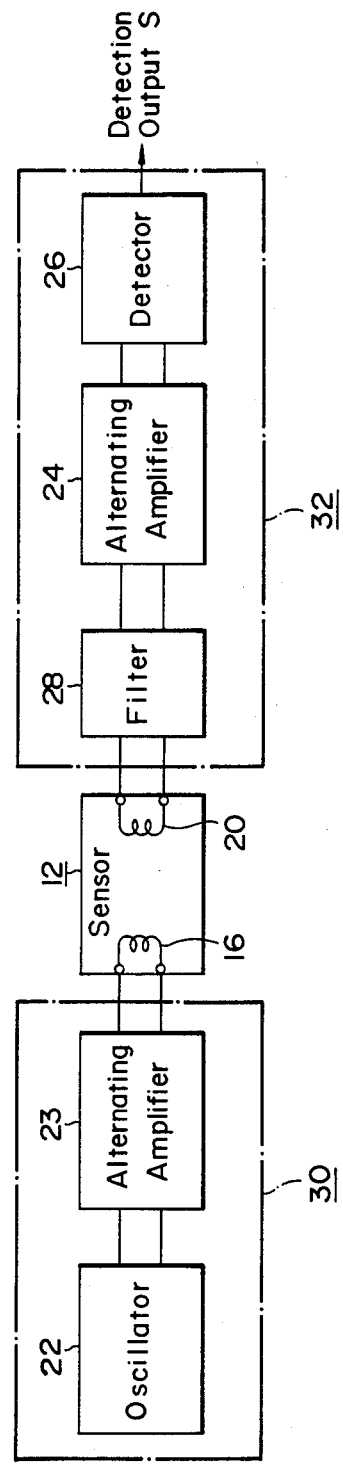
FIG. 5 is a block diagram of the structures of the driving circuit and the detection signal processing circuit shown in FIG. 1.

FIG. 5 shows an example of a driving circuit 30 connected to the excitation coil 16 of the magnetic sensor 12 and the detection signal processing circuit 32 connected to the detection coil 20.

The driving circuit 30 includes an oscillator 22 and an alternating amplifier 26, and applies the symmetric AC wave form voltage such as a sine wave or a triangle wave output from the oscillator 22 to the excitation coil 16 through the alternating amplifier 26 so as to alternatingly magnetize the torque transmitting shaft 10.

The detection coil 20 of the magnetic sensor 12 detects by electromotive force the amount of magnetostriction produced in the torque transmitting shaft 10 at the time of applying torque to the torque transmitting shaft 10, and outputs the detection signal to a detection signal processing circuit 32.

The detection signal processing circuit 32 in this embodiment includes a filter 28, the alternating amplifier 24 and a detector 26, and rectifies the output voltage of the detection coil 20 so as to output the DC detection signal S as a torque detection signal.

The feature of the present invention lies in that a demagnetization coil 40 is opposed to the torque transmitting shaft 10, which is the rotary magnetic material, with a space therebetween, as shown in FIG. 1, and the torque transmitting shaft 10 magnetized by disturbing magnetic field is restored to the state of zero magnetization.

Figure 6:
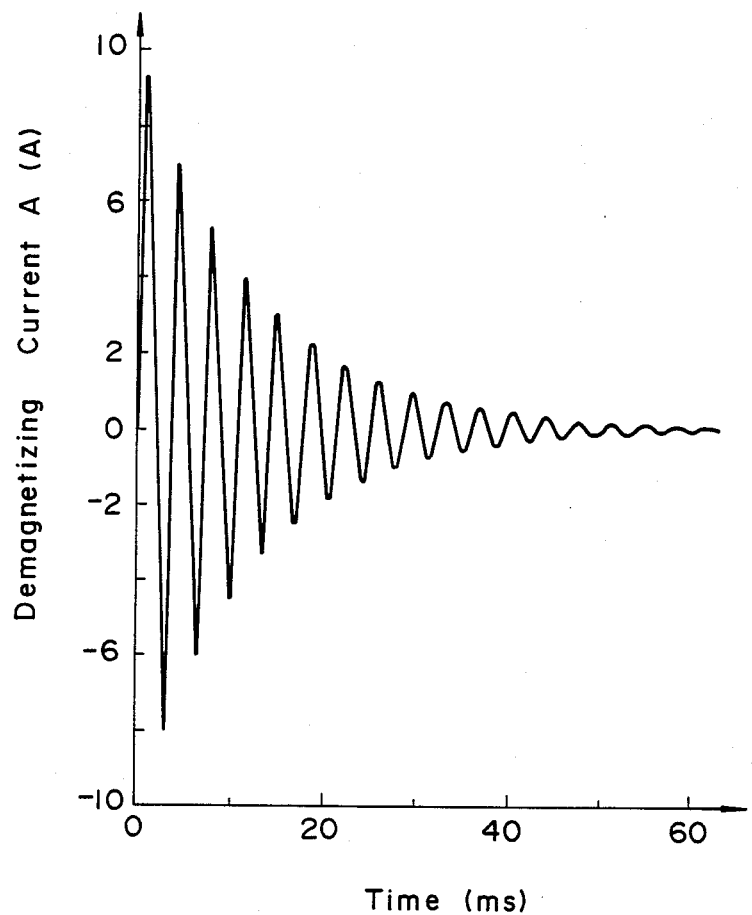
FIG. 6 is an explanatory view of periodic damping oscillating current flowing to the demagnetization coil in the first embodiment.

In this embodiment, the demagnetization coil 40 is wound around the torque transmitting shaft 10 with a space therebetween, and periodic damping oscillating current such as that shown in FIG. 6 is supplied from the periodic damping oscillating current generator 44, which constitutes a demagnetization circuit 42, to the demagnetization coil 40.

It is necessary to set the value of the periodic damping oscillating current so that the maximum amplitude of the periodic damping oscillating magnetic field generated in the rotary magnetic material by the current is larger than the coercive force of the torque transmitting shaft 10.

Figure 2:
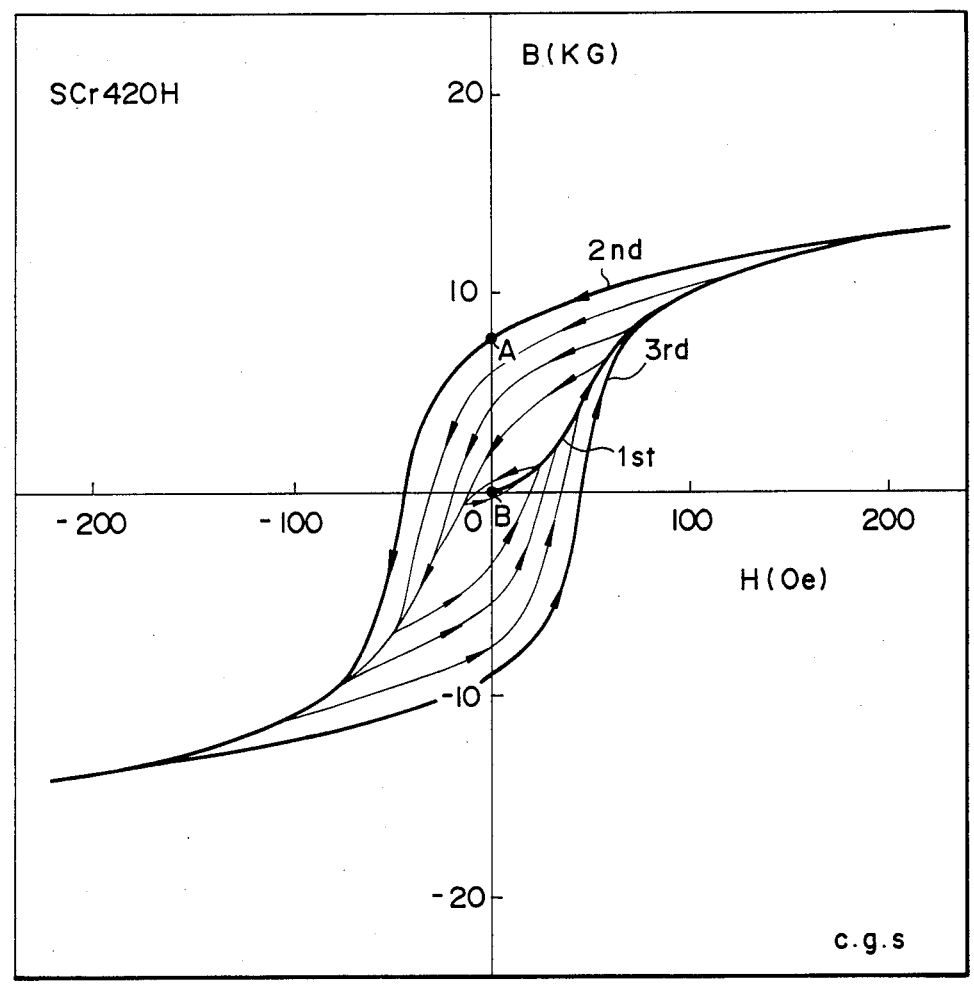
FIG. 2 is an explanatory view of the demagnetization treatment on a torque transmitting shaft.

The above-described structure enables the magnetized state of the torque transmitting shaft 10 to be restored to the state of zero magnetization in accordance with the characteristic curve B-H shown in FIG. 2 by applying the periodic damping oscillating current to the demagnetization coil 40 even when the torque transmitting shaft 10 is magnetized by a disturbing magnetic field.

Thus, according to the present invention, it is possible to measure the torque transmitted through the torque transmitting shaft 10 with high reproducibility and high accuracy without being influenced by a disturbing magnetic field.

In the present invention, the timing for driving the demagnetization circuit 42 is determined on the basis of a driving timing signal output from a trigger circuit 46.

In this embodiment, the trigger circuit 46 includes a sensor 47 for detecting disturbing magnetic field and a timing pulse generator 48 for outputting a driving timing signal to the periodic damping oscillating current generator 44 every time the magnetic sensor 47 detects a disturbing magnetic field, and restores the torque transmitting shaft 10 automatically to the state of zero magnetization every time a disturbing magnetic field is applied to the torque transmitting shaft 10.

Although a Hall element is used as the sensor 47 in this embodiment, the present invention is not restricted thereto and the detection of a disturbing magnetic field may be carried out by using a magnetic resistance element, search coil or the demagnetization coil 40 itself.

The periodic damping oscillating current generator 44 in this embodiment is so designed as to generate a current having a sine wave which decreases exponentially, as shown in FIG. 6.

The material of the torque transmitting shaft 10 used in this embodiment is carburized steel SCr 420H having an adequate mechanical strength, and the coercive force thereof is 40 Oe. Therefore, the maximum amplitude of the oscillating current supplied from the periodic damping oscillating current generator 44 is set at a sufficient value for generating magnetic field having the maximum amplitude larger than the coercive force 40 Oe.

The apparatus of this embodiment is so designed as to suspend the function of the detection signal processing circuit 32 during demagnetization treatment and automatically resume the operation of the detection signal processing circuit 32 when the demagnetization treatment has been completed. More specifically, the apparatus is provided with a current sensor 50 for detecting the demagnetization current of the demagnetization coil 40 and a detection timing pulse generator 52 for generating a pulse signal in synchronization with detection starting timing and detection end timing of the demagnetization current.

When demagnetization current flows to the demagnetization coil 40, the current sensor 50 detects it, and in synchronization with the rise of the detection signal (detection starting timing) the detection timing pulse generator 52 outputs a timing pulse signal for commanding the suspension of the function of the detecting signal processing circuit 32.

When the demagnetization treatment is completed and the demagnetization current detected by the current sensor 50 becomes zero, the detection timing pulse generator 52 outputs a timing pulse signal for restoring the function of the detection signal processing circuit 32.

In this way, the apparatus of this embodiment is so designed as to suspend the detecting operation of transmitted torque during the demagnetization treatment of the torque transmitting shaft 10, but the present invention is not restricted thereto and even if the detection signal processing circuit 32 is operated during the demagnetization treatment, it is possible to detect transmitted torque with higher accuracy and responsiveness than with a conventional apparatus.

Figure 7:
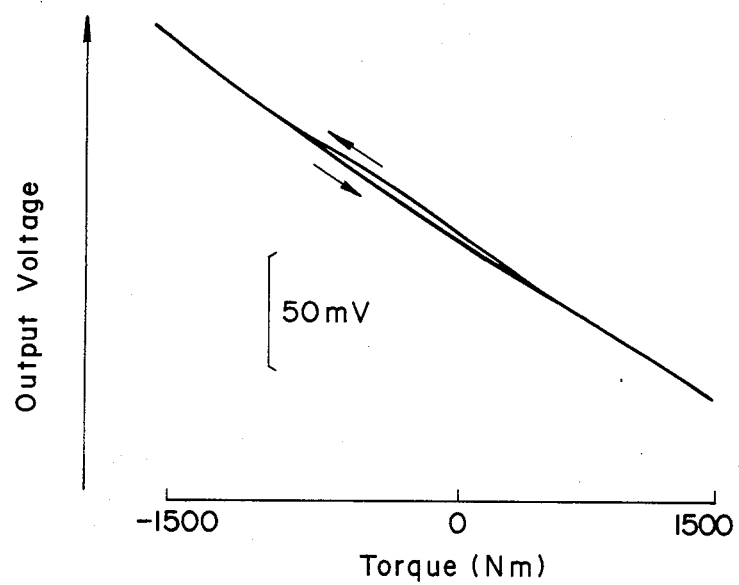
FIG. 7 is a characteristic curve of the torque detection output measured by a conventional apparatus after the generation of disturbing magnetic field.
Figure 8:
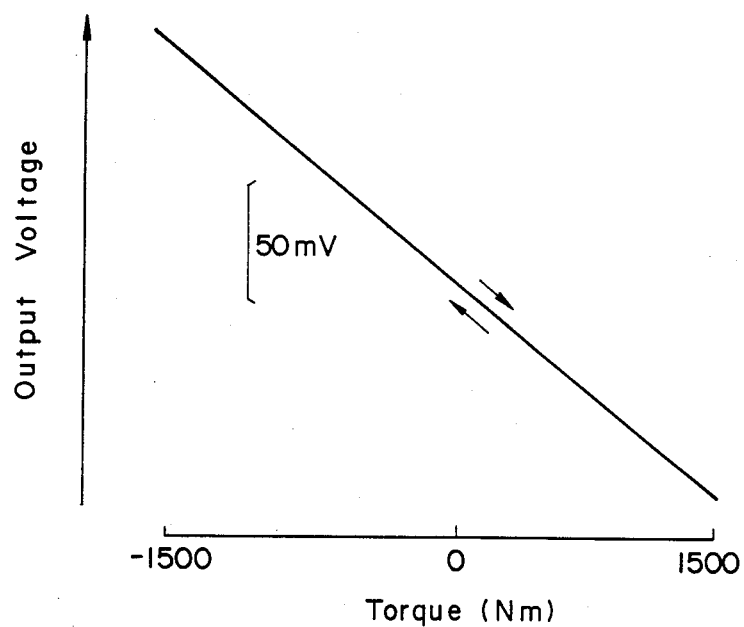
FIG. 8 is a characteristic curve of the torque detection output measured by the apparatus of the first embodiment after the generation of disturbing magnetic field.

FIGS. 7 and 8 show the detecting data measured by a conventional apparatus and a torque detecting apparatus of this embodiment, respectively, after the same disturbing magnetic field is applied to the respective torque transmitting shafts 10.

As shown in FIG. 7, the output characteristic shows a large hysteresis after a disturbing magnetic field is generated in the conventional apparatus. In contrast, in the apparatus of the present invention, the output characteristic is stable irrespective of the generation of a disturbing magnetic field, as shown in FIG. 8.

Although the magnetic sensor 12 is composed of the excitation coil and the detection coil disposed orthogonally to each other in the first embodiment, the magnetic sensor 12 in accordance with the present invention may be any sensor that can detect a change in the magnetic characteristic of the torque transmitting shaft 10 which is produced when torque is transmitted. For example, the magnetic sensor may consist of a detection coil alone for detecting a change in impedance.

In the first embodiment, in order to suspend the function of the detection signal processing circuit 32, the current sensor 50 and the detection timing pulse generator 52 are provided. The present invention, however is not restricted thereto, and the operation time of the periodic damping oscillating current generator 44 may be preset and a driving timing signal may be supplied from the timing pulse generator 48 to the detection signal processing circuit 32 as indicated by the broken line in FIG. 1. In this case, it is necessary that the detection signal processing circuit 32 is so designed as to have the function suspended for a predetermined time (corresponding to the operation time of the periodic damping oscillating current generator 44) after the driving timing signal is input. This structure dispenses with the sensor 50 and the detection timing pulse generator 52, thereby simplifying the structure of the circuit as a whole.

Second Embodiment

Figure 9:
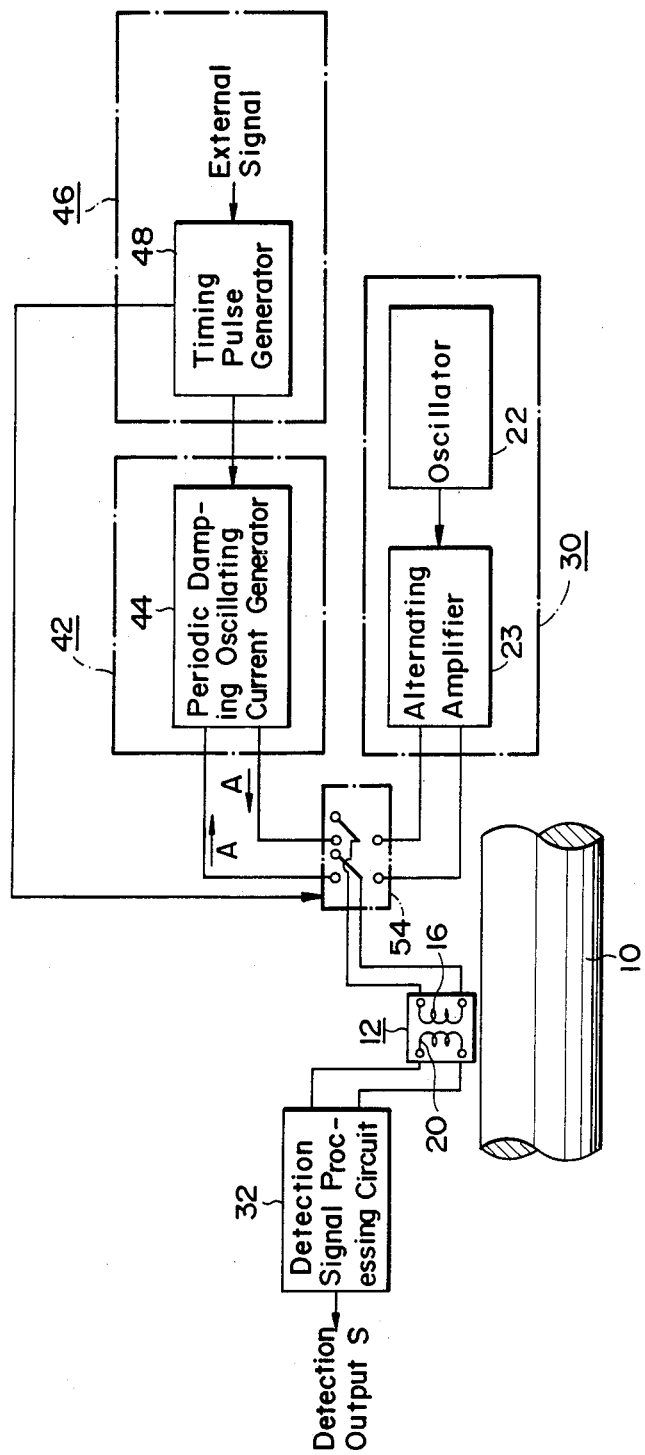
FIG. 9 is an explanatory view of a second embodiment of a torque detecting apparatus according to the present invention.

FIG. 9 shows a second embodiment of a torque detecting apparatus according to the present invention.

The apparatus of this embodiment is characterized in that a switch 54 is used and the excitation coil 16 also serves as the demagnetization coil, while the coil 40 is used exclusively for the demagnetization coil in the first embodiment.

The switch 54 is ordinarily connected to the side of the alternating amplifier 23.

Therefore, in the apparatus of this embodiment, since a voltage having a symmetric alternating wave form such as a sine wave or a triangle wave is applied from the oscillator 22 to the coil 16 through the alternating amplifier 23, the coil 16 functions as the exciting coil and alternatingly magnetize the torque transmitting shaft 10.

When a predetermined driving timing signal is output from the timing pulse generator 48, the switch 54 is switched to the side of the periodic damping oscillating current generator 44, thereby making the coil 16 function as the demagnetization coil (40).

More specifically, in the apparatus of this embodiment, a driving timing signal is output from the timing pulse generator 48 to the periodic damping oscillating current generator 44 and the switch 54 in synchronization with a given external signal.

The switch 54 is then switched from the side of the alternating amplifier 23 to the side of the periodic damping oscillating current generator 44. Simultaneously, the periodic damping oscillating current generator 44 is driven so as to supply a periodic damping oscillating current similar to that in the first embodiment to the coil 16.

As a result, the coil 16 functions as the demagnetizing coil, thereby demagnetizing the torque transmitting shaft 10.

The maximum amplitude of the demagnetization current applied to the coil 16 is set at a value sufficient for generating magnetic field larger than the coercive force of the material of the torque transmitting shaft 10 as in the first embodiment.

In this embodiment, since a timing signal output from the timing pulse generator 48 is synchronized with a given external signal, demagnetization treatment can be carried out at any given time. For example, the apparatus may be so designed as to carry out demagnetization treatment at every start of torque measurement or at every end of torque measurement, or carry out demagnetization treatment by inputting an external signal at a predetermined periodic interval.

Since the excitation coil 16 of the magnetic sensor 12 also serves as the demagnetization coil in this embodiment, the range for demagnetization is restricted by the dimensional limitation of the sensor 12. It is therefore necessary in this embodiment to rotate the torque transmitting shaft 10 for moving the part of the surface of the torque transmitting shaft 10 to be demagnetized to the position facing the magnetic sensor 12 before the demagnetization treatment.

Figure 10:
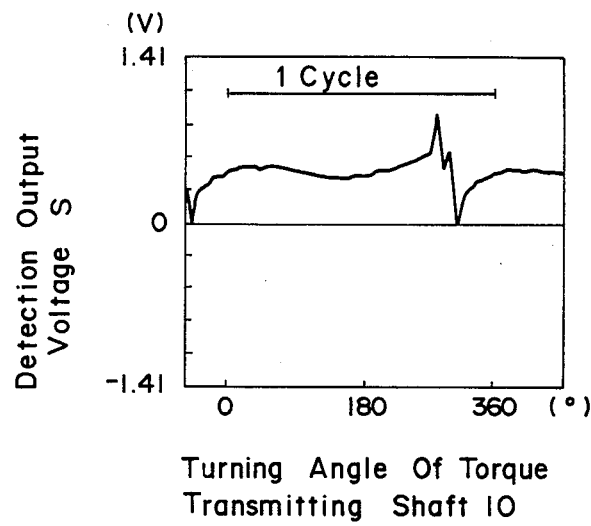
FIG. 10 is an explanatory view of the offset output distribution in the circumferential direction of the torque transmitting shaft measured by the conventional apparatus after the generation of a disturbing magnetic field.
Figure 11:
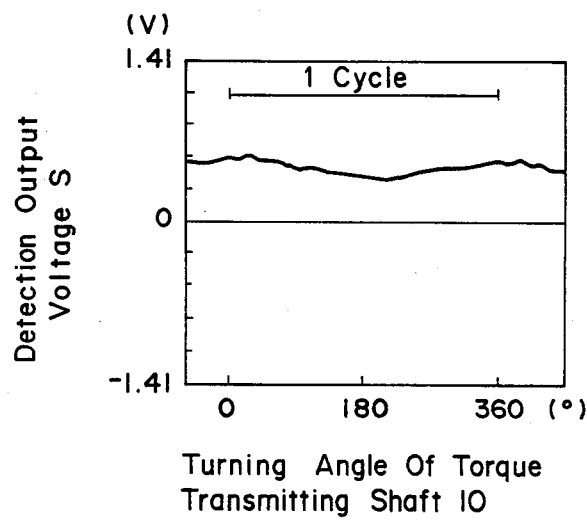
FIG. 11 is an explanatory view of the offset output distribution in the circumferential direction of the torque transmitting shaft measured by the apparatus of the second embodiment after the generation of a disturbing magnetic field.
Figure 14:
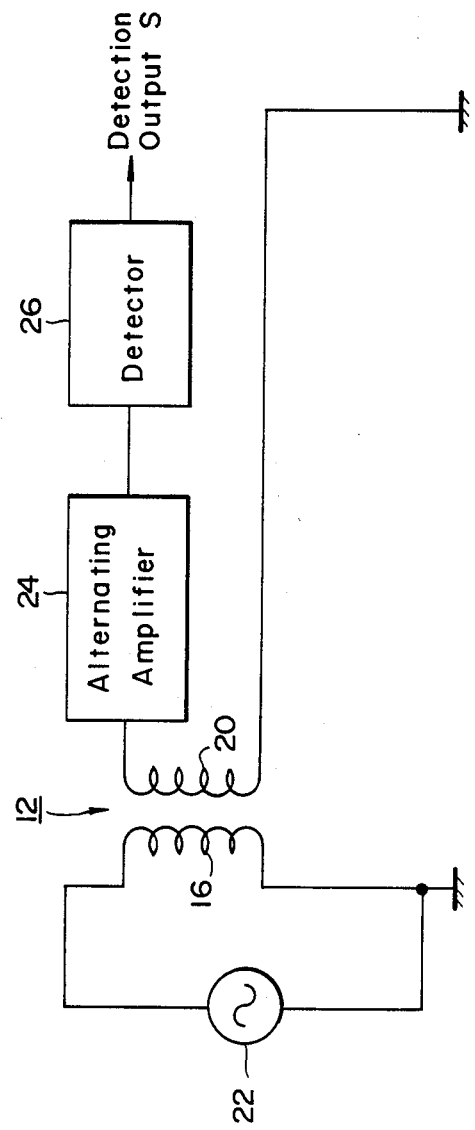
FIG. 14 is a block diagram of the conventional torque detecting apparatus.
Figure 15:
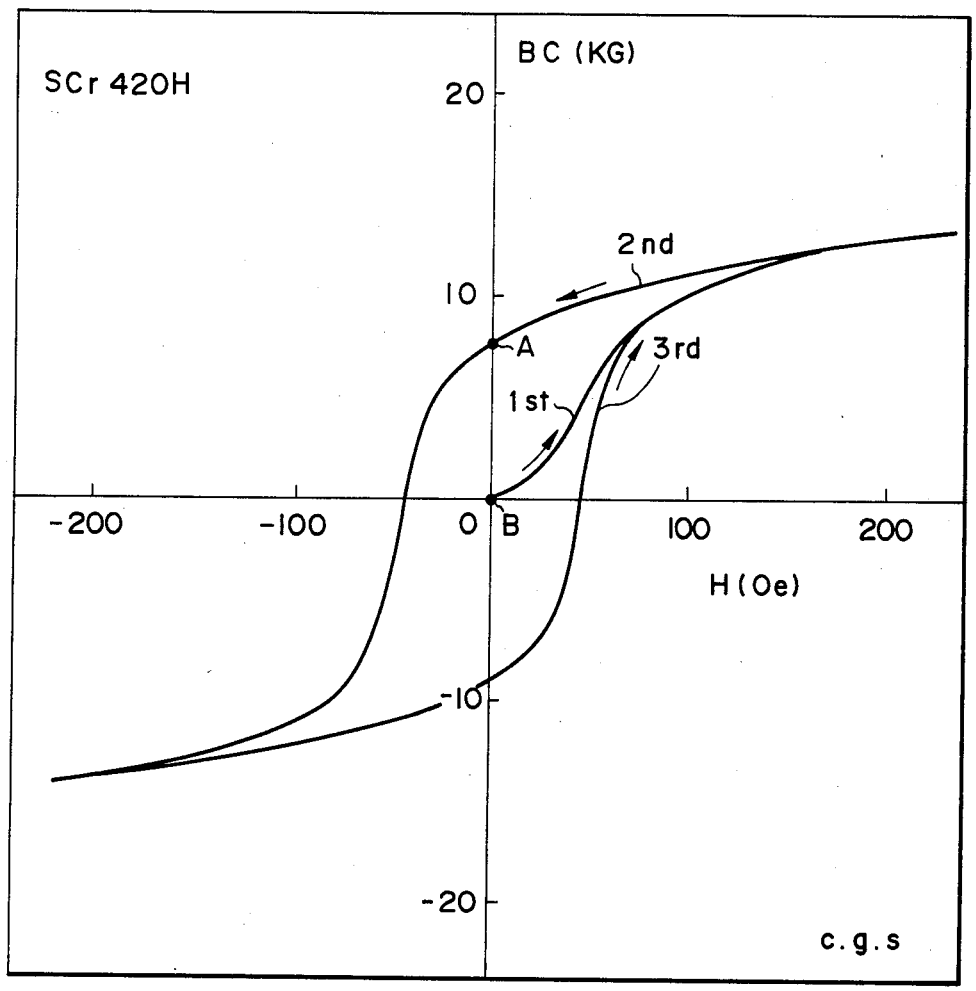
FIG. 15 is a B-H characteristic curve of carburized steel SCr 420H, which is selected as a material of a torque transmitting shaft.

FIGS. 10 and 11 shows the data measured by a conventional device and the apparatus of this embodiment, respectively, after a disturbing magnetic field which will magnetize only a part of the surface of the respective torque transmitting shafts 10 is generated. These data are offset output data in the circumferential direction (0° to 360°) of the torque transmitting shaft 10, namely, on the entire periphery of the torque transmitting shaft 10. As the material for the torque transmitting shaft 10, carburized steel SCr 420 H is used as in the first embodiment.

As shown in FIG. 10, in the conventional apparatus, when a disturbing magnetic field which will magnetize only a part of the surface of the torque transmitting shaft 10 is generated, the distribution of the offset signals in the circumferential direction of the rotary magnetic material shows a wave form having a spike wave form at the magnetized part, which fact shows that the detection signal S is changed even when transmitted torque is constant.

In contrast, according to this embodiment, the above-described demagnetization treatment enables the rotary magnetic material as a whole to maintain the same magnetized state, namely, the state of zero magnetization. Accordingly, as shown in FIG. 11, it is possible to suppress to a great extent the change in the offset output in the circumferential direction of the rotary magnetic material which is contained in the output signal of the magnetic sensor 12.

Although the magnetic sensor 12 is composed of the excitation coil and the detection coil disposed orthogonally to each other in this embodiment, the magnetic sensor may have another structure; for example, it may be composed of the excitation coil and the detection coil which are wound around the torque transmitting shaft 10.

Other Embodiments

Although the periodic damping oscillating current generator 44 is used as the demagnetization circuit 42 for carrying out the demagnetization treatment in the second embodiment, the present invention is not restricted thereto and a generator (ordinary oscillator) for an oscillating current having a constant amplitude may be used as the demagnetization circuit 42 for carrying out demagnetization treatment.

In this case, an oscillating current sufficient for generating oscillating magnetic field lager than the coercive force of the torque transmitting shaft 10 is caused to flow to the magnetic sensor 12 so as to generate magnetic field larger than the coercive force in the torque transmitting shaft 10. The torque transmitting shaft 10 is then rotated to gradually move the part on the torque transmitting shaft 10 to be demagnetized from the position closest to the magnetic sensor 12 to a position distant therefrom.

The demagnetization treatment will be explained in more detail. If attention is paid to a certain point P on the surface of the torque transmitting shaft 10, the intensity of the magnetic field of the point P is the maximum when the point P is opposed to the magnetic sensor 12 (the turning angle $\theta$ at this time is assumed to be 0°). As the torque transmitting shaft 10 is gradually rotated, the distance between the point P and the magnetic sensor 12 is increased and the intensity of the magnetic field of the point P is decreased. When the turning angle $\theta$ becomes $\theta = 180°$, the intensity of the magnetic field of the point P is the minimum.

Accordingly, it is possible to generate a periodic damping oscillating magnetic field having the maximum value larger than the coercive force in the point P of the torque transmitting shaft 10 so as to demagnetize the point P by causing the oscillating current having a constant amplitude to flow to the magnetic sensor 12 and rotate the torque transmitting shaft 10 from $\theta = 0°$ to $\theta = 180°$. This mechanism proves this method to be effective.

The torque detecting apparatus of this embodiment dispenses with the need for the periodic damping oscillating current generator 44 which serves as the demagnetization circuit 42 unlike the first and second embodiments, and an oscillator for generating an oscillating current having a constant amplitude suffices. It is therefore possible to use the oscillator 22, for example, shown in FIG. 9 also as the demagnetization circuit 42, thereby simplifying the structure of the whole apparatus.

In this case, it is preferable that the oscillator 22 having a high frequency and high output is used.

Figure 16:
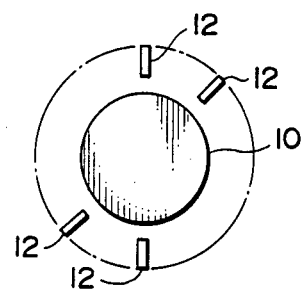
FIG. 16 is an explanatory view of a magnetic sensor having a multi-sensor structure.

Only one magnetic sensor 12 which is opposed to the torque transmitting shaft 10 is provided in the above-described embodiments, but the present invention is not restricted thereto and a multi-sensor structure having a plurality of magnetic sensors disposed around the torque transmitting shaft 10, as shown in FIG. 16, may be adopted so as to further improve the detection accuracy.

When the torque transmitting shaft 10 is rotated in the apparatus having the one magnetic sensor 12, the center of the torque transmitting shaft 10 fluctuates with the rotation and the space between the magnetic sensor 12 and the torque transmitting shaft 10 changes. In this case, when the offset output supplied from the magnetic sensor 12 is measured, the offset output exhibits a fluctuating wave form having the period corresponding to the number of revolutions of the torque transmitting shaft 10, so that the torque detection output disadvantageously varies in accordance with the rotation of the torque transmitting shaft.

Adoption of the multi-sensor structure solves this problem, and the fluctuations of the torque detection outputs in accordance with the rotation of the torque transmitting shaft 10 are cancelled by each other, thereby producing detection output with good reproducibility.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A torque detecting apparatus comprising:
   a magnetic sensor for measuring the amount of magnetostriction of a rotary magnetic material which transmits torque;
   a demagnetization coil which is opposed to said rotary magnetic material so as to restore said rotary magnetic material magnetized by a disturbing magnetic field to the state of zero magnetization;
   a demagnetization circuit for applying an oscillating current to said demagnetization coil so as to generate in said rotary magnetic material a periodic damping oscillating magnetic field having the maximum value larger than the coercive force of said rotary magnetic material; and
   a trigger circuit for outputting a drive timing signal for driving said demagnetization circuit;
   whereby transmitted torque is detected on the basis of the amount of magnetostriction of said rotary magnetic material measured by said magnetic sensor without being influenced by a disturbing magnetic field.

2. A torque detecting apparatus according to claim 1, wherein said trigger circuit includes:
   a sensor for detecting said disturbing magnetic field; and
   a timing pulse generator for outputting said drive timing signal to said demagnetization circuit every time said sensor detects said magnetic field;
   whereby said rotary magnetic material is automatically restored to said state of zero magnetization every time said disturbing magnetic field is applied to said rotary magnetic material.

3. A torque detecting apparatus according to claim 1, wherein said trigger circuit outputs said drive timing signal in synchronization with an external signal so as to enable demagnetization treatment at any given time.

4. A torque detecting apparatus according to claim 1, wherein said demagnetization circuit is composed of a periodic damping oscillating current generator for outputting a periodic damping oscillating current which generates in said rotary magnetic material a periodic damping oscillating magnetic field having the maximum value larger than the coercive force of said rotary magnetic material.

5. A torque detecting apparatus according to claim 1, wherein said demagnetization circuit applies an oscillating current having a constant amplitude to said demagnetization coil so as to generate in said rotary magnetic material magnetic field larger than the coercive force of said rotary magnetic material, and the region to be demagnetized is gradually moved from the position closest to said demagnetization coil to a position distant therefrom.

6. A torque detecting apparatus according to claim 1, wherein said magnetic sensor includes an excitation coil for alternatingly magnetizing said rotary magnetic material and a detection coil for detecting the amount of magnetostriction produced in a torque transmitting shaft.

7. A torque detecting apparatus according to claim 6, wherein said magnetic sensor includes an excitation core of disposed in parallel to said rotary magnetic material, and a detection core disposed inside said excitation core so as to be orthogonal thereto, with said excitation coil and detection coil being wound around said excitation core and said detection core respectively.

8. A torque detecting apparatus according to claim 6, further comprising:
   a driving circuit for applying a symmetric AC wave form voltage to said excitation coil of said magnetic sensor for alternating magnetization of said rotary magnetic material; and
   a detection signal processing circuit for rectifying the output voltage of said detection coil of said magnetic sensor and outputting the DC detection signal as a torque detection signal.

9. A torque detecting apparatus according to claim 1, wherein said demagnetization coil is wound around said rotary magnetic material with a space therebetween.

10. A torque detecting apparatus according to claim 4, wherein said periodic damping oscillating current generator outputs a periodic damping oscillating current having a sine wave which attenuates exponentially.

11. A torque detecting apparatus according to claim 8, further comprising:
   a current sensor for detecting the start and the end of demagnetization on the basis of the demagnetized current of said demagnetization coil; and
   a detection timing pulse generator for outputting a detection signal in synchronization with each timing of said start and end of demagnetization;
   wherein said detection signal processing circuit is so controlled to suspend the function during said demagnetization treatment and automatically resume the operation after the end of said demagnetization treatment on the basis of said detection signal output from said detection timing pulse generator.

12. A torque detecting apparatus according to claim 1, wherein
   said magnetic sensor includes an excitation coil connected to a driving circuit so as to alternatingly magnetize said rotary magnetic material and a detection coil connected to a detection signal processing circuit so as to detect the amount of magnetostriction produced in a torque transmitting shaft;
   said driving circuit applies a symmetric AC wave form voltage to said excitation coil for alternating magnetization of said rotary magnetic material;
   said detection signal processing circuit rectifies the output voltage of said detection coil and outputs the DC detection signal as a torque detection signal;
   said trigger circuit includes a sensor for detecting disturbing magnetic field applied to said rotary magnetic material and a timing pulse generator for outputting a drive timing signal every time said sensor detects said disturbing magnetic field, whereby said rotary magnetic material is automatically restored to said state of zero magnetization every time said disturbing magnetic field is applied to said rotary magnetic material; and
   said demagnetization circuit is composed of a periodic damping oscillating current generator for outputting a periodic damping oscillating current which generates in said rotary magnetic material periodic damping oscillating magnetic field having the maximum value larger than the coercive force of said rotary magnetic material.

13. A torque detecting apparatus according to claim 12, further comprising:
   a current sensor for detecting the start and the end of demagnetization on the basis of the demagnetized current of said demagnetization coil; and
   a detection timing pulse generator for outputting a detection signal in synchronization with each timing of said start and end of demagnetization;
   wherein said detection signal processing circuit is so controlled to suspend the function during said demagnetization treatment and automatically resume the operation after the end of said demagnetization treatment on the basis of said detection signal output from said detection timing pulse generator.

14. A torque detecting apparatus according to claim 1, wherein said magnetic sensor includes an excitation coil to alternatingly magnetize said rotary magnetic material and a detection coil for detecting the amount of magnetostriction produced in a torque transmitting shaft;
   said excitation coil being selectively connected to said demagnetization circuit and an exciting driving circuit for alternating magnetization of said rotary magnetic material through a switch, so as to be used also as a demagnetization coil.

15. A torque detecting apparatus according to claim 1, wherein a plurality of said magnetic sensors are annularly disposed around said rotary magnetic material, whereby even if there is a change in the space between each of said magnetic sensors and said rotary magnetic material due to the center fluctuation of said rotary magnetic material produced when said rotary magnetic material rotates, the fluctuation of the torque detection outputs are cancelled by each other.

16. A torque detecting apparatus according to claim 8, wherein said demagnetization circuit operates for a predetermined time after said drive timing signal is output from said trigger circuit so as to excite said demagnetization coil, while said detection signal processing circuit is so controlled to suspend the operation for said predetermined time after said drive timing signal is output from said trigger circuit.

* * * * *